United States Patent
Chiu

(10) Patent No.: US 8,983,559 B2
(45) Date of Patent: Mar. 17, 2015

(54) MOBILE PHONE CASE STRUCTURE CAPABLE OF STANDING, CLAMPING AND COILING

(71) Applicant: Shi-Xun Chiu, New Taipei (TW)

(72) Inventor: Shi-Xun Chiu, New Taipei (TW)

( * ) Notice: Subject to any disclaimer, the term of this patent is extended or adjusted under 35 U.S.C. 154(b) by 330 days.

(21) Appl. No.: 13/672,699

(22) Filed: Nov. 8, 2012

(65) Prior Publication Data

US 2014/0128130 A1    May 8, 2014

(51) Int. Cl.
*H04M 1/00* (2006.01)
*H04M 1/18* (2006.01)
*H04M 1/04* (2006.01)

(52) U.S. Cl.
CPC ............... *H04M 1/185* (2013.01); *H04M 1/04* (2013.01)
USPC .................. 455/575.8; 455/575.1; 455/575.4; 455/575.5; 379/433.11; 379/433.12; 379/433.13

(58) Field of Classification Search
CPC ..... H04M 1/0283; H04M 1/185; H04M 1/02; H04M 1/021; H04M 1/0206–1/0252
USPC .......... 455/575.1–575.8; 379/433.11–433.13, 379/437, 440, 451, 453–455
See application file for complete search history.

(56) References Cited

U.S. PATENT DOCUMENTS

| | | | |
|---|---|---|---|
| 6,285,758 B1 * | 9/2001 | Lu | 379/446 |
| 7,110,802 B1 * | 9/2006 | Kim et al. | 455/575.6 |
| 7,422,379 B2 * | 9/2008 | Agevik et al. | 396/424 |
| 8,162,283 B1 * | 4/2012 | Royz et al. | 248/455 |
| 8,490,783 B1 * | 7/2013 | Fan | 206/45.23 |
| 8,681,491 B1 * | 3/2014 | Cruz et al. | 361/679.56 |
| 2002/0132592 A1 * | 9/2002 | Fan | 455/90 |
| 2003/0103624 A1 * | 6/2003 | Hu | 379/455 |
| 2004/0198470 A1 * | 10/2004 | Dyer et al. | 455/575.1 |
| 2009/0036174 A1 * | 2/2009 | Brandenburg et al. | 455/575.1 |
| 2009/0221333 A1 * | 9/2009 | Harvey | 455/575.1 |
| 2009/0233656 A1 * | 9/2009 | Ross, III | 455/575.1 |
| 2009/0325654 A1 * | 12/2009 | Shi | 455/575.3 |
| 2010/0142175 A1 * | 6/2010 | Cheng et al. | 361/825 |
| 2013/0100601 A1 * | 4/2013 | Griffin et al. | 361/679.27 |

\* cited by examiner

*Primary Examiner* — Mehmood B Khan
(74) *Attorney, Agent, or Firm* — Alexander Chen, Esq.

(57) ABSTRACT

An improved mobile phone case structure capable of standing, clamping and coiling, including a case. The case is to cover the back side of a mobile phone. And the surface of the case is configured with a rectangular opening. Inside the rectangular opening, a frame is embedded. One side of the frame is pivoted with the rectangular opening, while the other side of the frame is pivoted with a coiling plate. When unfolded, the frame forms a support for the case to stand. The coiling plate has an arc design. When unfolded, the frame can be clamped comfortably by two fingers, and can provide a function to neatly coil and fix the earphone. When not used, the coiling plate can be in flat contact with the back side of the mobile phone. The unique combination of frame and coiling plate designed by the present invention integrates multiple functions and is therefore a valuable innovation.

5 Claims, 8 Drawing Sheets

MOBILE PHONE CASE STRUCTURE CAPABLE OF STANDING, CLAMPING AND COILING

BACKGROUND OF INVENTION

1. Field of the Invention

The present invention relates to an improved mobile phone case structure, and more particularly to a mobile phone case capable of standing, clamping and coiling.

2. Description of Related Art

Mobile phone cases are generally used to fit onto the mobile phone enclosure for protection and personalized decoration. The main function of a mobile phone case is to protect the surface of the mobile phone from frequent frictions and scratches and to withstand slight impacts. Apart from the single function of protection, some mobile phone cases provide additional alterations to offer functions of standing or hooking etc. However, such practical convenient functions are for specific purposes only, and are not particularly innovative. Such structures may even affect the overall esthetic appearance of the mobile phone case, and reduce the consumers' buying desire.

In view of this, to improve the conventional mobile phone cases with single function of protection, or mobile phone cases with single specific additional function which is insufficient to meet the needs and desires of the consumers, after researching the consumers' usage behavior, the inventor of the present invention has developed an innovative mobile phone case with integrated practical functions of standing, clamping and coiling. Such a structural improvement not only overcomes the functional limitations, but also brings great benefits to the public consumers.

Thus, to overcome the aforementioned problems of the prior art, it would be an advancement if the art to provide an improved structure that can significantly improve the efficacy.

Therefore, the inventor has provided the present invention of practicability after deliberate design and evaluation based on years of experience in the production, development and design of related products.

SUMMARY OF THE INVENTION

The main objective of the present invention is to provide a mobile phone case, with a unique frame and coiling plate configured on the case, so that, when the frame is unfolded, a triangular support can be formed and the case is capable of standing, and when not using, the frame can be in flat contact with the back side of the case.

The secondary objective of the present invention is to provide a mobile phone case, with a unique arc coiling plate configured on the case, so that the user can comfortably clamp the mobile phone by putting two fingers on the two sides of the plate.

Another objective of the present invention is to provide a mobile phone case with a coiling plate to neatly and conveniently coil and fix the earphone cord.

To achieve the above purposes, the present invention provides an improved mobile phone case structure capable of standing, clamping and coiling, including a case, covering on the back side of a mobile phone, with a rectangular opening. Inside the rectangular opening, a frame is embedded. One end of the frame is pivoted with the rectangular opening, and the other end of the frame is connected with a coiling plate. When unfolded, they will form a triangular support for the case to stand. The coiling plate is made in an arc style. When the frame is extended, the user can clamp the mobile phone comfortably with two fingers. Meanwhile, it offers a function to neatly coil and fix the earphone cord. When not used, the coiling plate can be in flat contact with the back side of the case. The combination of a unique frame and coiling plate designed by the present invention integrates multiple practical functions and is therefore a valuable innovation.

Further, the present invention provides a coiling plate with symmetrical arc design, and with a through-hole to fix a pair of earphones.

Further, the combination of case, frame, and coiling plate provided in the present invention can be enlarged to fit other electronic devices like Mp3 player, tablet computer, notebook computer etc.

The structural construction, technical means and functions are detailed below with the accompanying drawings:

DETAILED DESCRIPTION OF THE INVENTION

Figure 1:
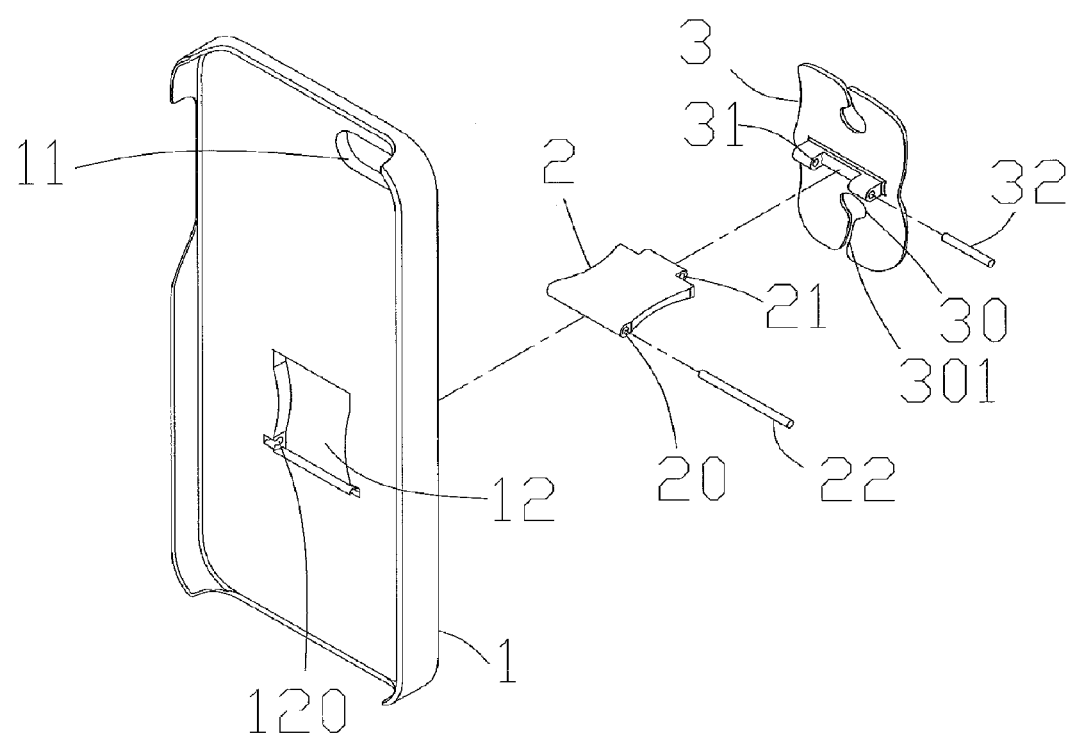
FIG. 1 is an exploded perspective view of a preferred embodiment of the present invention.
Figure 2:
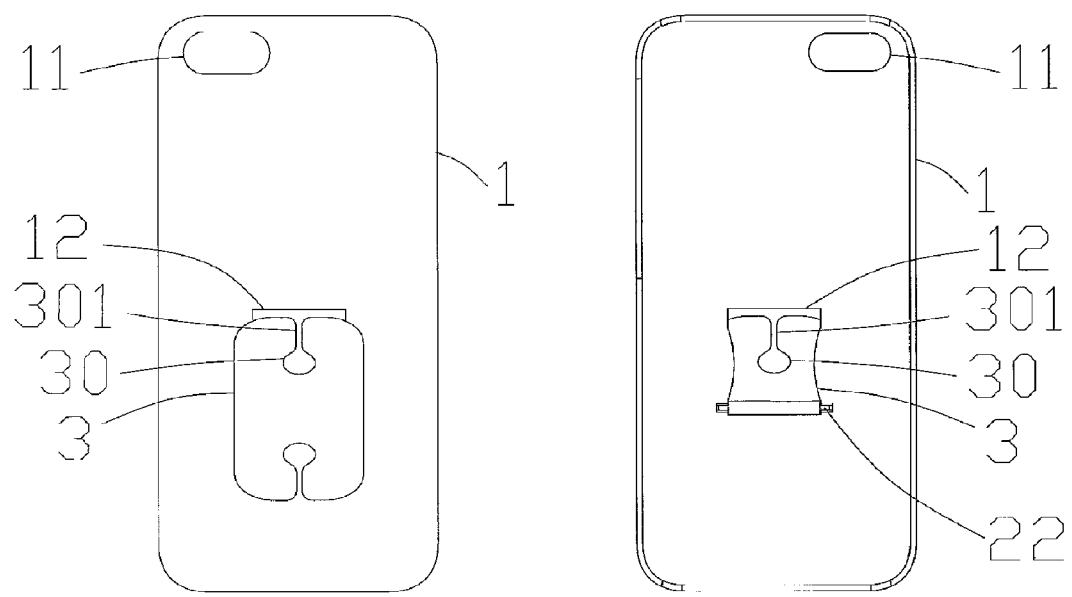
FIG. 2 is a front and back view of a preferred embodiment of the present invention.
Figure 3:
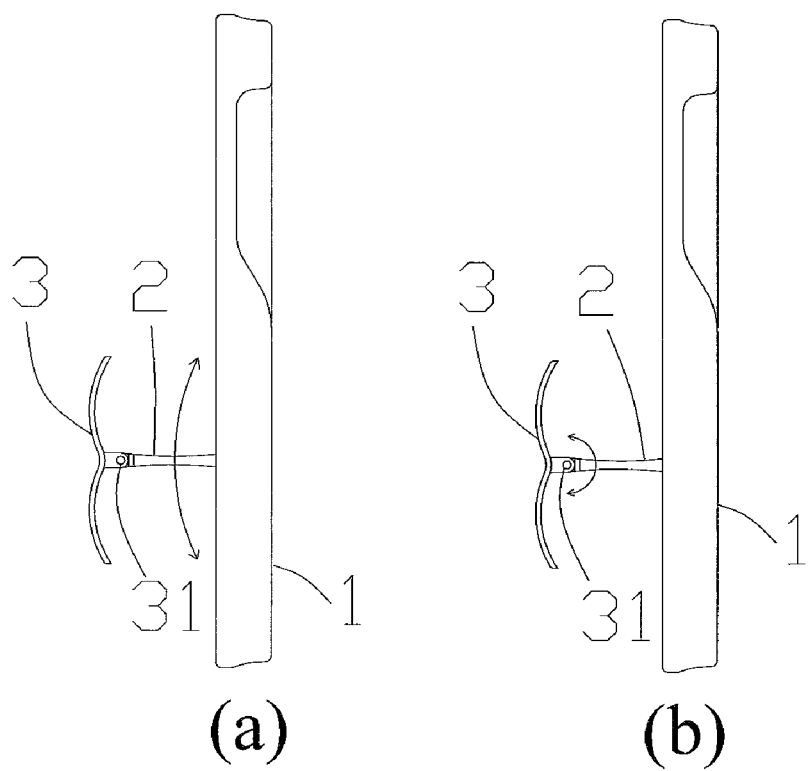
FIG. 3 is a side view of a preferred embodiment of the present invention.
Figure 4:
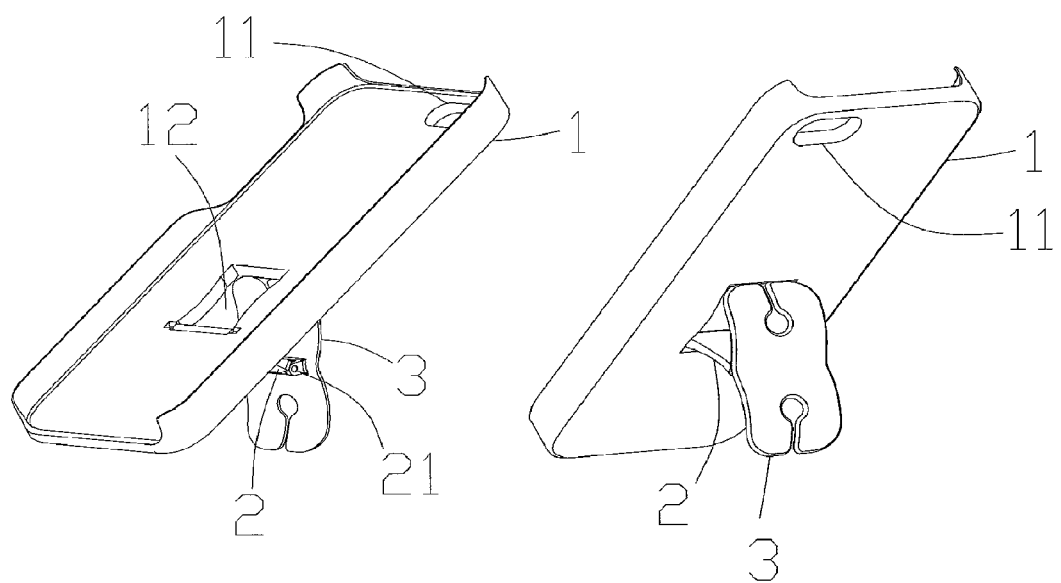
FIG. 4 is a combined perspective view of a preferred embodiment of the present invention.
Figure 5:
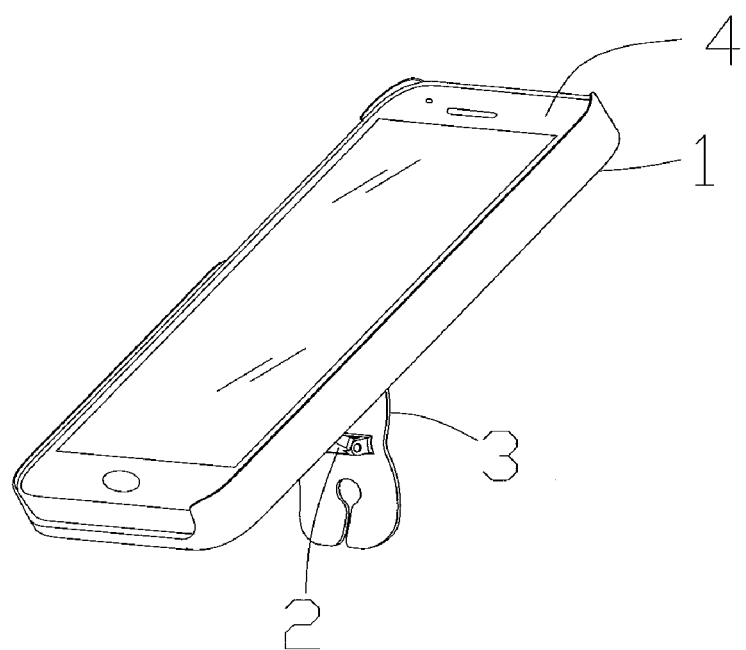
FIG. 5 is a schematic view of a preferred embodiment of the present invention with the mobile phone standing.
Figure 6:
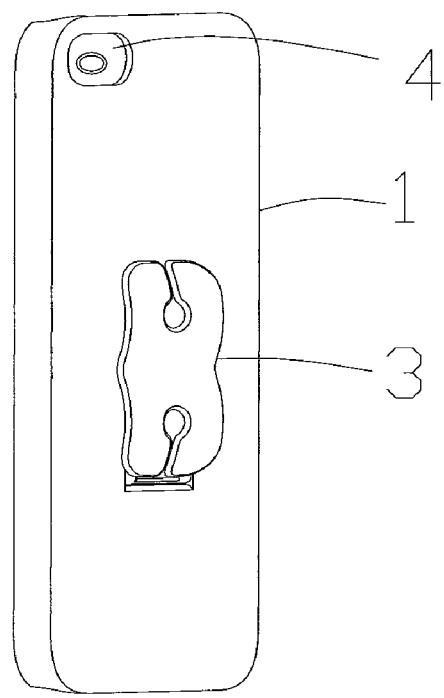
FIG. 6 is a schematic view of a preferred embodiment of the present invention with the coiling plate folded.
Figure 7:
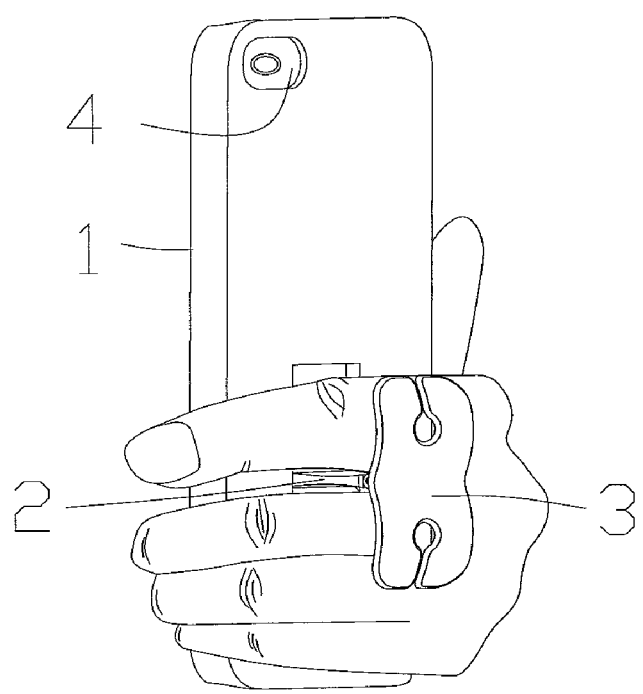
FIG. 7 is a schematic view of a preferred embodiment of the present invention clamped by the hand.
Figure 8:
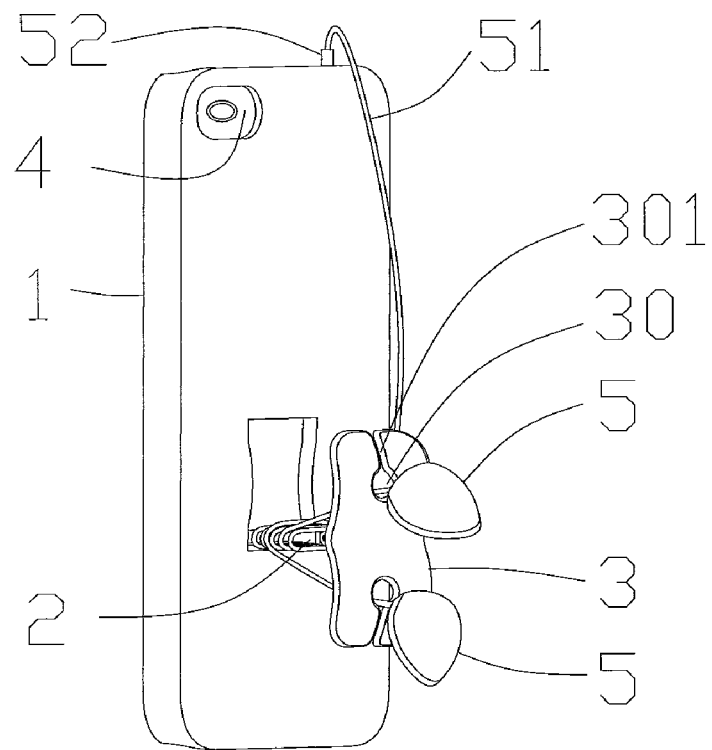
FIG. 8 is a schematic view of a preferred embodiment of the present invention with the earphone coiled and fixed on the frame.

The present invention provides an improved mobile phone case structure capable of standing, clamping and coiling. Firstly, referring to the drawings: FIG. 1 is an exploded perspective view of a preferred embodiment; FIG. 2 is a front and back view; FIG. 3 is a side view; FIG. 4 is a combined perspective view; FIG. 5 is a schematic view with the mobile phone standing; FIG. 6 is a schematic view with the coiling plate folded; FIG. 7 is a schematic view showing the clamping; FIG. 8 is a schematic view with the earphone coiled and fitted on the frame. The present invention mainly comprises: a case (1), a frame (2), and a coiling plate (3).

The case (1) is made of soft material like plastic, leather etc. The case (1) is mainly used to cover the back side of the mobile phone to protect the mobile phone. The case (1) is in a rectangular and concave shape. The case (1) is configured with an oval opening (11) corresponding to the mobile phone lens. The case (1) has a rectangular opening on its surface (12). One side of the rectangular opening (12) is configured with a combining portion. In the present embodiment, a round embedding hole (120) is configured on each side of the inner edge of the lower side of the rectangular opening (12).

The frame (2) is a rectangular plate and can be fitted into the rectangular opening (12), with arc surfaces on both sides. A combining portion is configured respectively on both ends. In the present embodiment, the combining portion configured on one side of the frame (2) is a long inner through-hole (20) corresponding to the width of the rectangular opening (12), while the combining portion configured on the other end is a short inner through-hole (21). One end of the frame (2) is pivoted with the rectangular opening (12) through a round shaft (22) going through the long inner through-hole (20) of the frame (2) and the two ends of the round shaft (22) fitted into the round embedding holes (120) correspondingly configured on the two sides of the rectangular opening (12). And through this rotary shaft, the frame (2) can rotate vertically for 90 degrees up and down, as shown in FIG. 3 (a).

The coiling plate (3), being a rectangle, forms two symmetrical arc surfaces curving from the center of the longer side edge respectively to the two shorter side edges, and guiding arcs on the peripheral edges. The two arc surfaces can be contacted and covered respectively by two fingers, and the mobile phone can be clamped by the hand through the frame (2). In this way, the case can be clamped comfortably, meeting ergonomic requirement. The coiling plate (3) is configured with an arc hole (30) respectively on each of the two arc surfaces. The arc hole (30) opens a thin and long arc line (301) towards the center of the shorter side. On the center of one side of the coiling plate (3), a combining portion is configured to pivot with the combining portion configured on the other end of the frame (2). In the present embodiment, the combining portion of the coiling plate (3) is two fixing ends respectively configured with a through-hole (31), and respectively corresponding to the two sides of the shorter inner through-holes (21) of the frame (2). They are combined together by a round shaft (32) going through. Through this rotating shaft, the frame (2) can rotate for 90 degrees horizontally left and right, as shown in FIG. 3 (b).

Referring to the combined embodiment shown in FIG. 4, the two ends of the frame (2) respectively pivots with the rectangular opening (12) and the coiling plate (3) and can rotate around each other. By rotating the coiling plate (3) and contact its upper edge with the upper side of the rectangular opening (12) to form an intersection angle, the coiling plate (3) and the frame (2) will form a triangular support so that the case (1) can stand. The front side of the case (1) holds a mobile phone (4). Referring to FIG. 5, when unfolded, the coiling plate (3) and the frame (2) can form a triangular support to enable the case (1) to stand. When not used, the coiling plate (3) can be in flat contact with the back side of the case (1), as shown in FIG. 6.

Referring to both FIG. 3 and FIG. 7 showing the clamping state, the frame (2) and the coiling plate (3) can be rotated to be perpendicular to each other, and the user can put two fingers to clamp the case. As the peripheral edges of the coiling plate (3) have guiding arc, and have two symmetrical arc surfaces, the case can be held comfortably. By holding the frame (2) between two fingers, the mobile phone (4) is not easy to fall from the hand.

Referring to FIG. 3 and FIG. 8, the frame (2) and the coiling plate (3) are rotated to be perpendicular to each other. It provides a function to coil and fix a pair of earphones (5). A pair of earphones (5) has an earphone cord (51) with a connector (52) on one end to be inserted into the earphone hole (not shown in the drawing) of the mobile phone (4). The earphone cord (51) can be coiled onto the frame (2). When coiling to the end, the earphone cord (51) can be put through the thin and long arc line (301) guiding to the arc hole (30), and the pair of earphones (5) can be respectively clamped and fixed in the arc hole (30) of the coiling plate (3).

To conclude, the main objective of the present invention is to provide mobile phone case that differs from ordinary mobile phone cases in the market that only have the basic function of protection. In the improved mobile phone case structure of the present invention, apart from the basic mobile phone protection function, it provides a unique design of a combination of frame and coiling plate on the case, through which, the mobile phone can stand when the frame is unfolded, while when folded, the frame can be in flat contact with the back side of the case. Moreover, the coiling plate can neatly coil and fix the earphone cord. The frame and coiling plate are both designed in a streamlined arc shape, which meets the ergonomic requirement. By putting two fingers on both sides of the coiling plate, the mobile phone can be comfortably clamped. Hence, the case of the present invention integrates multiple functions. Also, the case, frame and coiling plate of the present invention can be enlarged to any size to fit various electronic devices like Mp3 player, tablet computer, notebook computer. It is indeed a valuable innovation.

All in all, the present invention actually has a great industrial and practical value. It is indeed an excellent and outstanding innovative design to be patented according to the related laws.

Although the invention has been explained in relation to its preferred embodiment, it is to be understood that many other possible modifications and variations can be made without departing from the spirit and scope of the invention as hereinafter claimed.

The invention claimed is:

1. An improved mobile phone case structure capable of standing, clamping and coiling, including:
   a case, to cover the enclosure of the mobile phone to protect the mobile phone; the surface of the case is configured with a rectangular opening, and one side of the rectangular opening is configured with a combining portion;
   a frame, which can be fitted into the rectangular opening; both sides of the frame are configured with a combining portion, wherein one combining portion on one side provides pivoting between the frame and the rectangular opening of the case;
   a coiling plate, with a combination portion configured on the center of one side, which pivots with the combining portion configured on the other side of the frame;
   wherein the combining portion of the rectangular opening is provided with a round embedding hole on each side of the inner edge of the lower side of the rectangular opening;
   wherein the combining portion on one side of the frame and the combining portion on one side of the rectangular opening are fitted together by a round shaft, and the two ends of the round shaft are embedded into the round embedding holes provided on the two sides of the lower side of the rectangular opening to achieve pivoting.

2. The improved mobile phone case structure as claimed in claim 1, wherein a combining portion is configured on the center of one side of the coiling plate, being two fixing ends with a through-hole respectively.

3. The improved mobile phone case structure as claimed in claim 2, wherein the combining portion configured on the center of one side of the coiling plate and the combining portion configured on the other side of the frame are fixed together by a round shaft to achieve pivoting.

4. The improved mobile phone case structure as claimed in claim 1, wherein two symmetrical arc surfaces are formed from the center of the longer sides of the coiling plate to the two shorter sides, and on the peripheral edges, a guiding arc is formed; on the two symmetrical arc surfaces of the coiling plate, an arc hole is configured respectively; the arc hole opens a thin and long arc line toward the center of the shorter side.

5. The improved mobile phone case structure as claimed in claim 1, wherein the combination of case, frame, and coiling plate can be applied in any electronic device like Mp3 player, tablet computer, and notebook computer.

* * * * *